United States Patent [19]

Shimizu

[11] Patent Number: 4,978,994
[45] Date of Patent: Dec. 18, 1990

[54] EXPOSURE SYSTEM FOR IMAGE FORMING APPARATUS

[76] Inventor: Kenichi Shimizu, 1-775, Kosugijinyacho, Nakahara-ku, Kawasaki-shi, Japan

[21] Appl. No.: 315,897

[22] PCT Filed: Jun. 23, 1988

[86] PCT No.: PCT/JP88/00623

§ 371 Date: Feb. 16, 1989

§ 102(e) Date: Feb. 16, 1989

[30] Foreign Application Priority Data

Jun. 23, 1987 [JP] Japan .................................. 62-154547

[51] Int. Cl.$^5$ ............................................ G03B 27/54
[52] U.S. Cl. ..................................................... 355/70
[58] Field of Search .................................... 355/68–70, 355/229; 362/11, 18

[56] References Cited

U.S. PATENT DOCUMENTS

| | | | |
|---|---|---|---|
| 3,375,752 | 4/1968 | Fairbanks et al. | 355/70 |
| 4,255,046 | 3/1981 | Corona | 355/68 |
| 4,334,767 | 6/1982 | Lehman | 355/68 |
| 4,551,011 | 11/1985 | Yuasa et al. | 355/69 X |

FOREIGN PATENT DOCUMENTS 252160  1/1988  European Pat. Off. .............. 355/70

OTHER PUBLICATIONS

L. J. Mason, "Aperture Control of Integrating Cavity Flash Lamp Exposure", Xerox Disclosure Journal, vol. 11, No. 2, Mar./Apr. 86, pp. 77–78.

H. M. Harris, "Adaptive Illumination Balancing System", Xerox Disclosure Journal, vol. 4, No. 6, Nov./Dec. 79, p. 787.

L. J. Mason, "Exposure Control with Multiple Flash Lamps", Xerox Disclosure Journal, vol. 10, No. 5, Sep./Oct. 89, pp. 295–296.

*Primary Examiner*—L. T. Hix
*Assistant Examiner*—D. Rutledge
*Attorney, Agent, or Firm*—Alfred E. Corrigan

[57] ABSTRACT

In an image forming apparatus in which a plurality of flash lamps mounted at approximately symmetrical positions are alternately lit for exposure of an original to obtain a copied image on a light sensitive film, distribution of exposures effected by the lamps disposed at the positions is made asymmetrical such that the total amount of exposure at a portion of the original undergone the most intensive exposure by the lamp lit first is minimum, while the total amount of exposure at a portion of the original undergone the least intensive exposure by the lamp lit first is maximum.

4 Claims, 4 Drawing Sheets

| SEQUENCE OF LAMP LIGHTING | TRANSMISSIVITY OF FILM (%) | | |
|---|---|---|---|
| | FRONT PORTION OF FILM | CENTER PORTION | REAR PORTION |
| FRONT→REAR | 11.7 | 10.6 | 9.5 |
| REAR→FRONT | 9.5 | 10.6 | 11.7 |

EXPOSURE SYSTEM FOR IMAGE FORMING APPARATUS

RELATED APPLICATION

This application is related to my copending application Ser. No. 315,898 filed Feb. 16, 1989, now U.S. Pat. No. 4,924,260.

TECHNICAL FIELD

The present invention relates to an image forming apparatus and more particularly to an exposure system for the image forming apparatus which is advantageously suited for forming an image on a light sensitive film.

BACKGROUND TECHNOLOGY

Heretofore, preparation of a slide used in connection with various publications has been conducted in a manner in which a 35-mm camera 101 is fixedly mounted on a stand 102, facing downwardly, on which an original 105 is illuminated by light sources 103 as flash lamps or the like supported on the stand 102 by arms 104, while the photographing is carried out by releasing a shutter of the camera 101, as is shown in FIG. 6. In that case, the operator is required to adjust the height of the camera in dependence on the size of the original 105 for the purpose of realizing the proper focus. Besides, the shutter speed and aperture value have to be determined in dependence of the species of the original 105, the type of the light source 103 and the brightness thereof.

Such operation, however, requires skillfulness, and it was difficult to prepare a desirable slide unless the operator has some knowledge photography technology.

With a view to eliminating the shortcomings of the prior art to thereby provide an image forming apparatus capable of forming a clear image with simplified manipulation without requiring skillfulness, the applicant of this application has made a proposal disclosed in Patent Application No. SHO 62-95374.

This apparatus includes an original supporting stage, a light source for illuminating the original disposed on the stage, light sensitive film holding means for holding detachably a light sensitive film at an imaging position, an imaging optical system for guiding light reflected from the original to the light sensitive surface of the abovementioned film, a shutter disposed in tbe imaging optical system for controlling exposure of the light sensitive film, switch means outputting a start signal for initiating the exposure of to the light sensitive film, and an operation controller outputting control signals at least for the abovementioned light source and shutter.

The length of the optical path extending from the abovementioned light source to the light sensitive film is previously determined. The operation controller mentioned above is characterized by such an arrangement that it outputs, sequentially, a shutter opening signal for opening the shutter, lighting means for causing the light source to emit light a predetermined number of times and a shutter closing signal for closing the shutter.

However, the technique described above suffers from unevenness in density.

The present invention has been made in view of the background described above and contemplates as an object to eliminate unevenness in the density of the photographed image.

DISCLOSURE OF THE INVENTION

The gist of the present invention resides in that a plurality of flash lamps are lit sequentially with such a quantity of light which gives rise to no unevenness in the exposure of the film due to the influence of reciprocity law failure.

BEST MODE OF CARRYING OUT THE INVENTION

In the following, an exemplary embodiment of the present invention will be described on the basis of the drawings.

Figure 1:
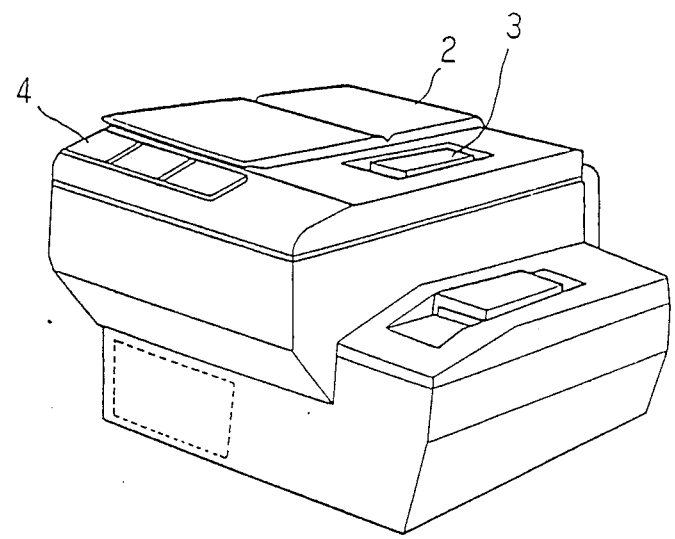
FIG. 1 is a view showing an external appearance of an image forming apparatus with which the present invention is concerned.

In FIG. 1, the image forming apparatus includes an original holding press plate 2, a photographing camera 3 and a manipulating portion 4.

Figure 2:
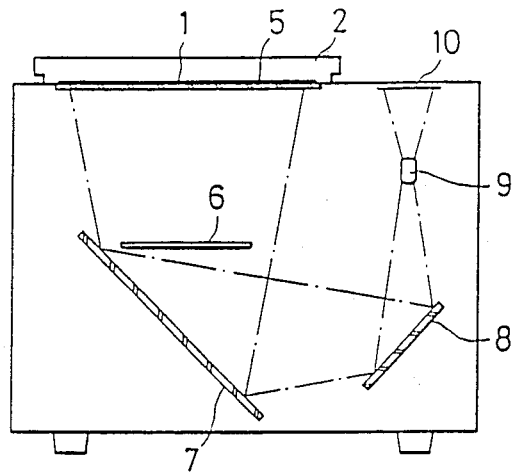
FIG. 2 is a front view showing schematically an optical system portion of the same.

In FIG. 2, an original 1 is disposed on a contact glass surface 5 and held down by the press plate Z. The original 1 is illuminated by the flash lamp 6, wherein light reflected from the original 1 is reflected at a first mirror 7 and a second mirror 8 and focussed onto a film 10 by passing through a taking lens 9. The film 10 is placed within the camera 3 (FIG. 1) and exposed to the light upon opening of the shutter in synchronism with the emission of light from the flash lamp 6.

Figure 3:
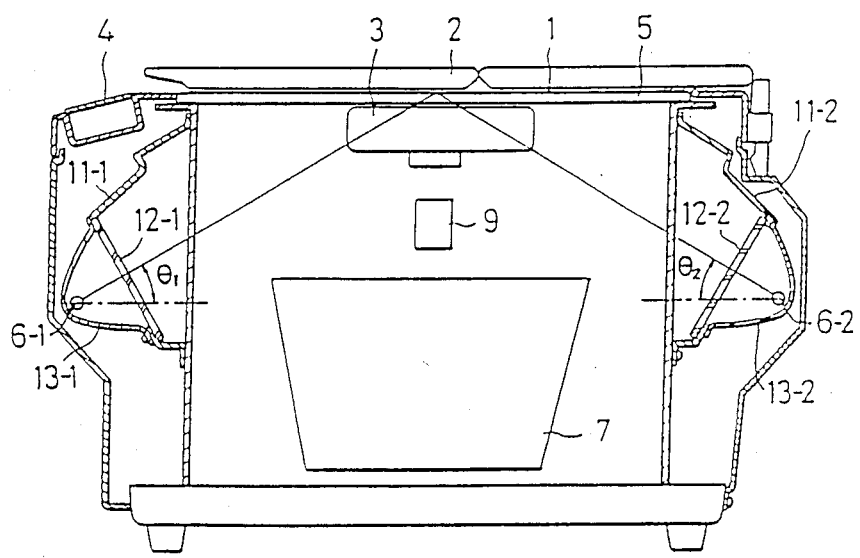
FIG. 3 is a side view of the same.

In FIG. 3, a pair of flash lamp units 11-1 and 11-2 are disposed substantially symmetrically as viewed in the longitudinal direction. The flash units include flash lamps 6-1 and 6-2, reflector Plates 13-1 and 13-2, and diffusing plates 12-1 and 12-2, respectively, and are oriented toward the original.

When a print key of the manipulating portion 4 is pressed with the original 1 having been disposed in place, a capacitor (not shown) is electrically charged, whereby the lamp 6-1 is first caused to emit light. After the lighting of the lamp 6-1, the capacitor is again charged, whereby the lamp 6-2 in turn is lit, whereupon the exposure is ended.

It is desirable that the exposure be as uniform in distribution as possible over the whole surface of the original. However, because of disposition of the lamp 6 within the limited inner space of the apparatus, the plane of the original 1 is located closely adjacent to tbe lamp 6, as tbe result of which great difficulty is encountered in preventing unevenness in the exposure with the single lamp 6. For this reason, the lamps are provided at two locations in this apparatus. Further, by lighting the two lamps 6-1 and 6-Z one by one rather than lighting them simultaneously, the quantities of light outputted by the front and rear lamps, respectively, in succession can be individually measured and controlled more accurately. Besides, the capacitor may be of a small capacity.

With this apparatus, nonuniformity of exposure over the surface of original could be substantially eliminated by employing the two lamps However, when a high contrast positive film "Polagraph" (trade name) available from the Polaroid Corporation was used and the transmission factor of the film was measured after development in succession to the photographing of an original having a constant density, it was found that the transmission factor is nonuniform over front to rear portions of the film. Hence, the sequence of lighting the lamps was reversed In that case, the transmittance distribution of the film showed an opposite tendency. The results are shown in FIG. 5.

The front lamp 6-1 tends to illuminate intensively the front surface of the original 1, while the rear lamp 6-2 illuminates more intensively the rear portion of the original 1. Thus, it is seen in view of the characteristics of tbe film that tbe portion subjected to the intensive illumination at the first lighting and feeble illumination upon the second lighting appears to have been more exposed than the portion illuminated with feeble light upon the first lighting and then intensively at the second lighting.

Figures 4, 5:
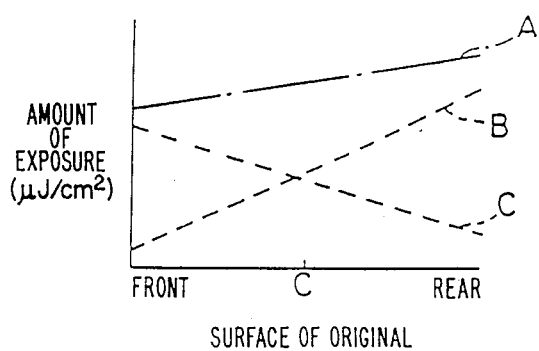
FIG. 4 is a view illustrating relationships between a surface of an original and the amount of exposure as realized by an exposure control according to tbe present invention.
FIG. 5 is a view showing relationships between lamp lighting sequences and a transmission factor of a film.
Figure 6:
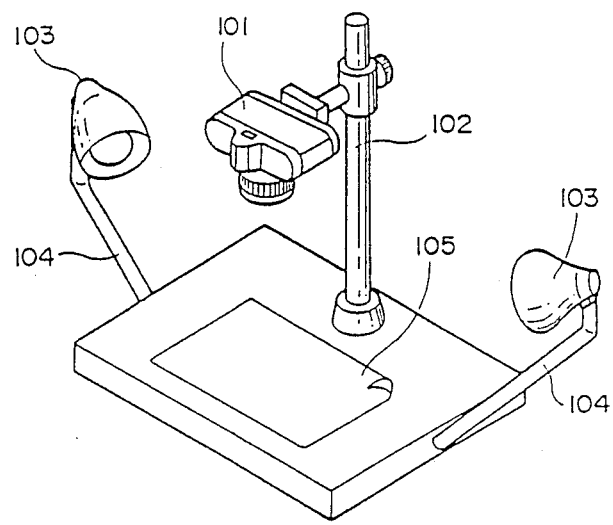
FIG. 6 is a view illustrating pictorially a slide preparation mode known heretofore.

Under the circumstances, in conjunction with the realization of uniformity in the density after development over the whole area of the film, it has been found that the transmission factor of the film becomes constant when the total amount of exposure is controlled to be minimum at a portion (front portion in this case) which is subjected to the maximum exposure at the first illumination, as is shown in FIG. 4.

As a method of making the amounts of the first and second exposures asymmetrical to each other, the angles $\theta_1$ and $\theta_2$ at which the lamps are mounted, as shown in FIG. 3, may be so selected that $\theta_1 < \theta_2$ or the diffusing plates 12-1 and 12-2 disposed in front of the lamps may be modified in the shape.

In FIG. 4, A represents the distribution of the total amount of exposure, B represents the distribution of the amount of second exposure, and C represents the distribution of the amount of first exposure.

Incidentally, a phenomenon that dispersion makes a difference in the density of a film after its development, even for a same amount of exposure, in dependence on the illuminance with which the film has been exposed to (even when the product of illuminance multiplied with time is constant) is generally referred to as reciprocity law failure. This phenomenon is correctively compensated for by adjusting the aperture of lens in consideration of the exposure time. However, in the case of the exposure system adopted in this apparatus, tbe above phenomenon can not be corrected solely with the aid of the aperture of the lens because the film density differs in dependence on locations.

Further, since difference is found in the reciprocity law failure in dependence on the types of films, distribution of exposure must be so determined that the film density is constant for the film actually used.

INDUSTRIAL UTILITY

The present invention has been described. According to the exposure system for an image forming apparatus which the present invention concerns, the influence of reciprocity law failure can be correctively compensated for due to the exposure through alternative light emissions of plural lamps.

I claim:

1. An image forming apparatus in which a plurality of flash lamps mounted at approximately symmetrical positions are alternately lit for exposure of an original to obtain a copied image on a light sensitive film, each of said flash lamps providing substantially the same exposure output, an exposure system characterized in that distribution of exposures effectuated by said lamps disposed at the positions symmetrical to each other is made asymmetrical, wherein the total amount of exposure at a portion of the original undergone the most intensive exposure by the flash lamp lit first becomes minimum, while the total amount of exposure at a portion of the original undergone the least intensive exposure by the flash lamp lit first becomes maximum.

2. Image forming apparatus comprising:
   means for supporting an original in position for exposure, said supporting means including front and rear end portions;
   means for locating a light sensitive material in position for receiving image-bearing light reflected from an image bearing surface of the original; and
   an exposure system for illuminating the original in a manner which will optimize its reproduction in the light sensitive material, said exposure system including first and second sources of artificial illumination symmetrically located with respect to an original supported on said supporting means and being located adjacent said front and rear end portions of said supporting means, respectively, each of said flash lamps providing substantially the same exposure output, said first source of illumination being adapted to illuminate a portion of the original located closest to said front end portion of said supporting means with a greater intensity than it illuminates the opposite end of the original located closest to said rear end portion, and said second source of illumination being adapted to illuminate a portion of the original located closest to said rear end portion of said support means with a greater intensity than it illuminates the end of the original located closest to said front end portion, said first and second sources of illumination being adapted to be alternately lit for illumination of the original in a manner whereby the total amount of exposure at a portion of the original undergone the most intensive exposure by the source of illumination first lit becomes minimum, while the total amount of exposure at a portion of the original undergone the least intensive exposure by the source of illumination first lit becomes maximum.

3. Image forming apparatus as defined in claim 2 wherein said first source of illumination has its beam of light directed at said supporting means at an angle less than that at which said second source of illumination is directed at said supporting means.

4. Image forming apparatus as defined in claim 2 wherein each of said first and second sources of illumination includes an adjustable diffusion plate.

* * * * *